United States Patent [19]

Neko

[11] Patent Number: 4,846,654
[45] Date of Patent: Jul. 11, 1989

[54] DIE-TOUCH POSITION DETECTING APPARATUS OF A MOTOR-OPERATED DIRECT MOLD CLAMPING MECHANISM

[75] Inventor: Noriaki Neko, Hachioji, Japan

[73] Assignee: Fanuc Ltd., Yamanashi, Japan

[21] Appl. No.: 217,880

[22] PCT Filed: Sep. 17, 1987

[86] PCT No.: PCT/JP87/00689
§ 371 Date: May 18, 1988
§ 102(e) Date: May 18, 1988

[87] PCT Pub. No.: WO88/01931
PCT Pub. Date: Mar. 24, 1988

[30] Foreign Application Priority Data

Sep. 22, 1986 [JP] Japan .................. 61-222103

[51] Int. Cl.[4] .................... B29C 45/80
[52] U.S. Cl. .................... 425/150; 264/40.5; 425/171; 425/589
[58] Field of Search ........... 425/149, 150, 171, 589; 264/40.5

[56] References Cited

U.S. PATENT DOCUMENTS 4,301,100 11/1981 Farrell .................. 425/149
4,696,632 9/1987 Inaba .................... 425/150

FOREIGN PATENT DOCUMENTS 67433 5/1980 Japan .
124632 9/1980 Japan .

Primary Examiner—Jay H. Woo
Assistant Examiner—Timothy W. Heitbrink
Attorney, Agent, or Firm—Staas & Halsey

[57] ABSTRACT

There is provided a die-touch position detecting apparatus capable of automatically and accurately detecting a die-touch position of a direct mold clamping mechanism driven by means of a servomotor. A numerical control unit (10) performs pulse distribution to a servo-circuit (30) in response to a die-touch position detecting operation command inputted through a manual data input device (17), thereby moving a movable platen toward a stationary platen. When the amount of errors accumulated in an error register (31) of the servo-circuit exceeds a predetermined value, the numerical control device stops the pulse distribution to the servo-circuit, and then calculates the die-touch position in response to the amount of pulse distribution to the servo-circuit and the amount of errors.

6 Claims, 3 Drawing Sheets

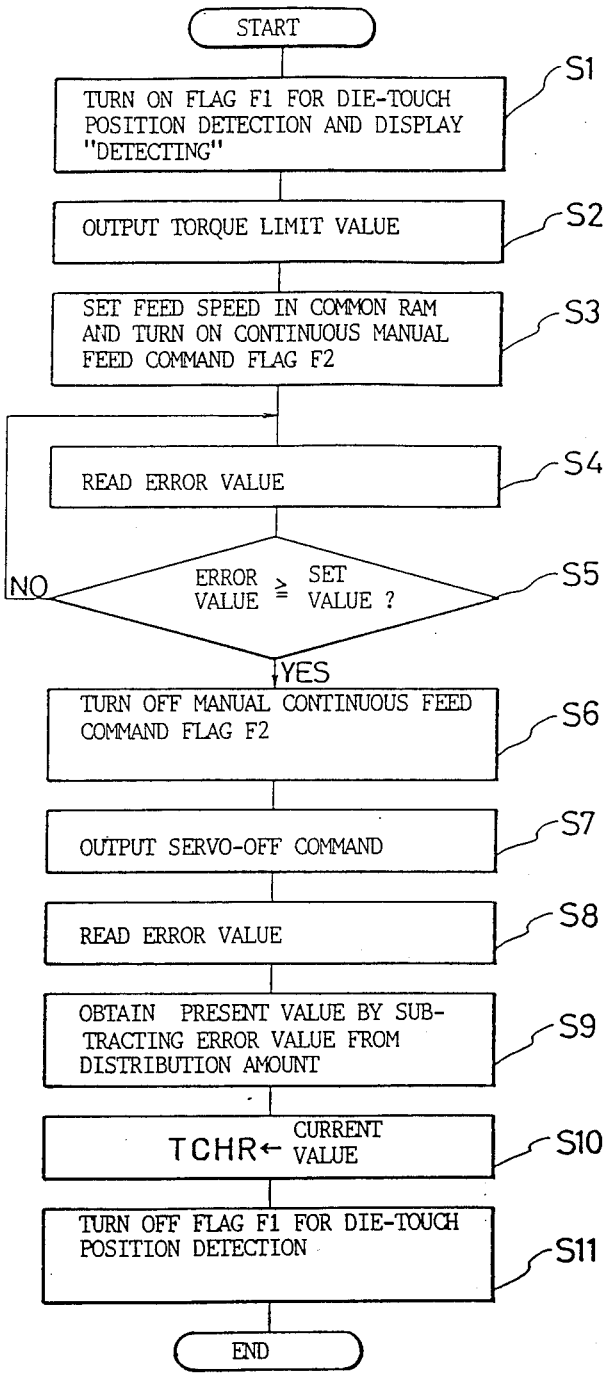

DIE-TOUCH POSITION DETECTING APPARATUS OF A MOTOR-OPERATED DIRECT MOLD CLAMPING MECHANISM

BACKGROUND OF THE INVENTION

1. Field of the Invention

The present invention relates generally to a mold clamping mechanism of an injection-molding machine, and more particularly, to a detecting apparatus capable of automatically and accurately detecting a die-touch position of a direct mold clamping mechanism which is driven by means of a servomotor.

2. Description of the Related Art

In a known motor-operated direct mold clamping mechanisms a movable platen disposed between a stationary platen and a rear platen is driven for mold clamping by means of a servomotor which is connected to the movable platen through a transmission mechanism. In the mold clamping apparatus of this type, a predetermined mold clamping force is produced by driving a movable die additionally for a predetermined distance in the direction for pressure contact, from a position where the movable die is in contact with a stationary die. Also, a mold opening end position, a die protection start position, etc. are determined on the basis of the die-touch position. In order to produce the predetermined mold clamping force and to perform a specified die opening/closing operation, therefore, the die-touch position must be detected and set accurately. Since the die-touch position varies depending on the thickness of the dies, moreover, it must be detected and set every time the die thickness is changed.

Conventionally, in detecting the die-touch position, an operator visually determines whether or not the die-touch position is reached by the movable platen, and manually adjusts the location of a limit switch for die-touch position detection so that the limit switch is turned on when the movable platen reaches the die-touchy position. In this case, it is difficult to accurately determine the arrival at the die-touch position. For example, a movable die position in which a mold clamping force of a certain size is already produced may be mistaken for the die-touch position. In consequence, the die-touch position cannot be detected and set accurately, so that satisfactory products cannot be manufactured. Moreover, the fine manual adjustment of the location of the limit switch is so troublesome that the efficiency is lowered.

SUMMARY OF THE INVENTION

An object of the present invention is to provide a die-touch position detecting apparatus of a motor-operated direct mold clamping mechanism, capable of detecting a die-touch position automatically and accurately.

In order to achieve the above object, according to the present invention, there is provided a die-touch position detecting apparatus used in a motor-operated direct mold clamping mechanism which has a movable platen movable relatively to a stationary platen, and a servomotor operatively coupled to the movable platen through a transmission mechanism and adapted to be driven by a servo-circuit.

The die-touch position detecting apparatus comprises drive control means for outputting a pulse distribution to the servo-circuit in response to a die-touch position detecting operation command, thereby moving the movable platen toward the stationary platen, stop means for causing the drive control means to stop the pulse distribution to the servo-circuit when the amount of errors accumulated in an error register of the servo-circuit exceeds a predetermined value, and calculating means for calculating a die-touch position in accordance with the amount of pulse distribution to the servo-circuit and the amount of errors when the pulse distribution is stopped.

According to the present invention, as described above, pulses are distributed to the servo-circuit until the amount of errors accumulated in the error register of the servo-circuit exceeds the predetermined value, after the die-touch position detecting operation command is delivered. When the pulse distribution is stopped, the die-touch position is calculated on the basis of the amount of pulse distribution and the error amount. Thus, the die-touch position can be detected automatically, and the location of a limit switch for die-touch position detection need not be adjusted, so that production efficiency can be improved. Also, the die-touch position can be detected with high accuracy corresponding to the cycle of production of pulses used to drive the servomotor.

BRIEF DESCRIPTION OF THE DRAWINGS

FIG. 3 is a flow chart illustrating operation of the apparatus of FIG. 2.

DETAILED DESCRIPTION OF THE PREFERRED EMBODIMENTS

Figure 1:
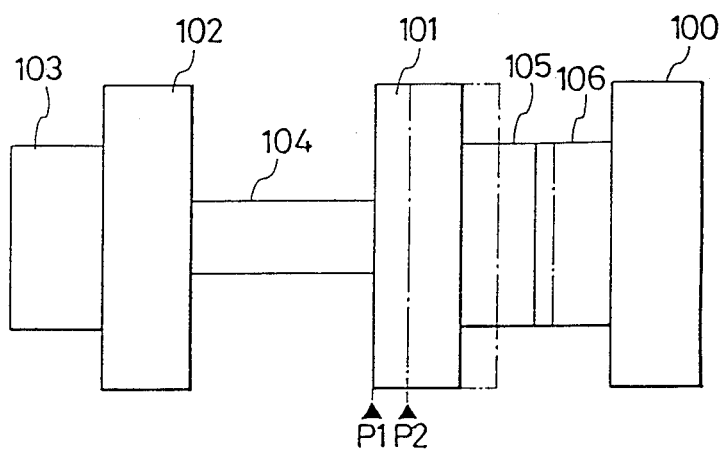
FIG. 1 is a schematic view illustrating part of a motor-operated direct mold clamping mechanism to which the present invention is applied.

In FIG. 1, a motor-operated direct mold clamping mechanism comprises a stationary platen 100 and a rear platen 102, which are fixed individually to a base (not shown) of an injection-molding machine, and a movable platen 101 disposed between the platens 100 and 102 for reciprocation. The movable platen 101 is connected to a drive source, composed of a servomotor 103, by means of transmission means 104 which includes a ball screw and a ball nut, for example. Dies 106 and 105 are attached to the platens 100 and 101, respectively. The mold clamping mechanism is designed so that a mold clamping force is produced when the movable platen 101 is driven further from a die-touch position P1, where the two dies are in contact with each other, toward the stationary platen 100, that is, in an advancing direction. The dies 106 and 105 of varied thicknesses are attached to the platens 100 and 101, respectively, so that the die-touch position changes, depending on the die thickness. The die-touch position when thin dies having the thickness indicated by dashed line in FIG. 1 are attached, for example, is designated by symbol P2.

Figure 2:
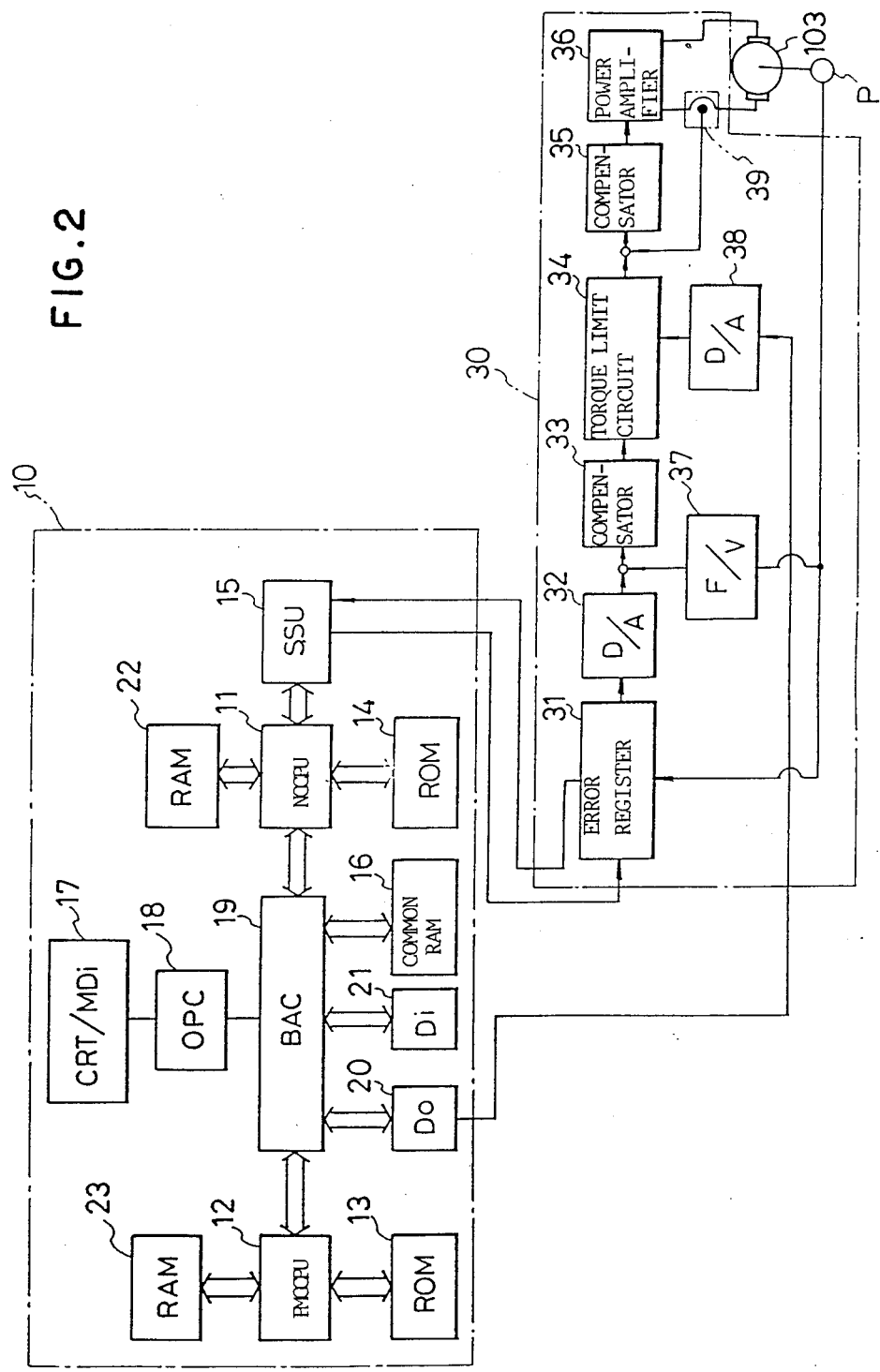
FIG. 2 is a schematic view showing a die-touch position detecting apparatus according to an embodiment of the present invention.

As shown in FIG. 2, a die-touch position detecting apparatus mounted on the injection-molding machine (not shown), which is provided with the aforementioned mold clamping mechanism, comprises a numerical control unit (hereinafter referred to as CNC) 10 with a built-in computer, a servo-circuit 30 for driving the servomotor 103 (FIG. 1), and a pulse encoder P attached to the servomotor 103 and used to detect the rotational position of the motor, i.e., the moved position of the movable platen 101. Although the CNC 10 and the servo-circuit 30 are shown separately for ease of illustration, all the elements of the servo-circuit 30 except a power amplifier 36 are contained in the CNC 10.

The CNC 10 includes a microprocessor (hereinafter referred to as CPU) 11 for NC and a CPU 12 for a programmable machine controller (hereinafter referred to as PMC). The PMCCPU 12 is connected with a ROM 13, which stores sequence programs and the like for executing die-touch position detecting operation and the like, while the NCCPU 11 is connected with a servo-interface 15 and a ROM 14, which stores a control program for generally controlling the injection-molding machine. The servo-interface 15 is connected with various servo-circuits for controlling the drive of servomotors for various axes for injection, screw rotation, ejector operation, etc., besides the aforesaid servomotor 103. Having no relation to the present invention, however, illustration of these servo-circuits is omitted.

Numeral 16 denotes a nonvolatile common RAM which, having a backup power source, serves to store programs for controlling various operations of the injection-molding machine, and various set values, parameters, etc., which will be described later. Numeral 17 denotes a manual data input device with a CRT display (hereinafter referred to as CRT/MDI), which is connected to a bus-arbiter controller (hereinafter referred to as BAC) 19 through an operator panel controller 18. The BAC 19 is connected with the NCCPU 11, the PMCCPU 12, the common RAM 16, an output circuit 20, and an input circuit 21, individually. The output circuit 20 is connected to a D/A converter 38 of the servo-circuit 30. Numerals 22 and 23 denote RAMs which are connected to the NCCPU 11 and the PMCCPU 12, respectively, and are used for tentative data storage.

In the servo-circuit 30, an error register 31 is supplied periodically with a movement command from the NCCPU 11 through the servo-interface 15. The movement command, which is indicative of a stroke for one period, is composed of a pulse train. As the servomotor 103 rotates, on the other hand, a pulse train is supplied from the pulse encoder P, and an error amount indicative of the difference between the two pulse trains is accumulated in the error register 31. This error amount is converted into an analog voltage as a speed command value by a digital-to-analog converter (hereinafter referred to as D/A converter) 32. In order to improve the responsiveness of the servo-circuit, moreover, speed feedback operation is performed. More specifically, a voltage obtained by converting a signal from the encoder P by means of an F/V converter 37 and corresponding to an actual servomotor speed is subtracted from the aforesaid speed command value. The result of such subtraction, i.e., the difference between the command speed and the actual speed, is amplified by means of a compensator 33. By doing this, a voltage corresponding to the value of a current supplied to the armature of the servomotor 103, that is, a torque command, is obtained. Thereupon, a torque limit circuit 34 is provided which receives the the torque limit command and limits the output torque of the servomotor M. In order to improve the responsiveness to the output of the torque limit circuit 34, a compensator 35 is used to amplify the difference between the torque command and a feedback voltage signal from a current detector 39. The feedback voltage signal corresponds to the armature current of the servomotor 103. Further, the output of the compensator 35 is amplified by the power amplifier 36, and then applied to the servomotor 103. Numeral 38 denotes the D/A converter which converts a torque limit command value from the CNC 10 into an analog signal, and applies the analog signal to the torque limit circuit 34.

The error value of the error register 31 can be read through the servo-interface 15 by means of the NCCPU 11.

Referring now to FIG. 3, the die-touch position detecting operation of the apparatus according to the present embodiment will be described.

When an operator inputs the die-touch position detecting operation command through the CRT/MDI 17 after attaching the dies to the stationary platen 100 and the movable platen 101, the PMCCPU 12 turns on a flag F1, indicative of the execution of the die-touch position detecting operation, in the common RAM 16, and makes an indication for the execution of the die-touch position detecting operation on a CRT screen of the CRT/MDI 17 (Step S1). Then, the PMCCPU 12 delivers a set torque limit value for the die-touch position detection to the D/A converter 38 of the servo-circuit 30 via the BAC 19 and the output circuit 20 (step S2). The D/A converter 38 converts the specified torque limit value into an analog voltage signal, and applies it to the torque limit circuit 34. As a result, the torque limit circuit 34 operates so as to restrict the torque command to the torque limit value or below. Thus, the servomotor 103 is driven with a low torque not higher than this torque limit value. After delivering the torque limit value in this manner, the PMCCPU 12 sets a predetermined low feed speed for the die-touch position detection in the common RAM 16, and turns on a command flag F2 for continuous manual feed in the advancing direction, in the common RAM 16 (Step S3). On reading the activation of the continuous manual feed command flag F2, the NCCPU 11 outputs a pulse distribution corresponding to the predetermined feed speed, to the servo-circuit 30, and adds pulses to the error register 31. The value in the error register 31 is converted and delivered as the speed command value by the D/A converter 32, as mentioned before. The difference between the speed command value and the present actual speed from the F/V converter 37 is amplified by the compensator 33, and is delivered as a torque command from the compensator 33. Due to the torque limit operation, as mentioned before, the torque limit circuit 34 never delivers such a torque command (voltage corresponding to the value of the current applied to the armature) as will permit production of a torque higher than a set value. The difference between the torque command and the actual armature current from the current detector 39 is amplified by the compensator 35, and the servomotor 103 is driven by means of the power amplifier 36. Thus, the movable platen 101 is driven at low speed and with low torque. As the servomotor 103 rotates, on the other hand, a pulse train is outputted from the pulse encoder P to the error register 31. Every time one pulse is inputted, "1" is subtracted from the error value. As a result, the difference between the movement command from the CNC 10 and an actual stroke from the pulse encoder P is stored in the error register 31.

While the movable platen 10 is moving, the NCCPU 11 reads the error value from the error register 31 through the servo-interface 15, and writes the value in a specified address of the common RAM 16 through the BAC 19. Then, the PMCCPU 12 reads the written error value (Step S4), and compares it with a set value (Step S5). The operations of Steps S4 and S5 are repeatedly executed while the movable platen is moving.

Thereafter, when the dies 105 and 106, attached to the movable platen 101 and the stationary platen 100, respectively, engaged each other, the movable platen ceases to advance, since the output torque of the servomotor 103 is restricted. As a result, feedback pulses from the pulse encoder P cease to be applied to the error register 31, so that distributed pulses are accumulated in the error register 31, thus increasing the error value above the set value. Thereupon, the PMCCPU 12 turns off the manual feed flag F2 in the common RAM (Step S6). In response to this, the NCCPU 11 stops continuous manual feed of a mold clamping axis. In other words, the pulse distribution to the servo-circuit 30 is stopped. Then, the PMCCPU 12 delivers a servo-off command to the NCCPU 11 through the common RAM 16 (Step S7), and NCCPU 11, on receiving the servo-off command, de-energizes the servomotor 103. Accordingly, the servomotor 103 is allowed to race, so that the dies 105 and 106 shift from a state such that they are pressed against each other with a force corresponding to the torque limit value, to a state such that they touch each other with a reaction force against the force of pressure contact. Thus, the movable platen 101 slightly retreats so that the pressure contact force goes out. As the platen retreats, the pulses delivered from the pulse encoder P are added to the error register 31. Thus, the error value stored in the error register 31 corresponds to the state that the dies 105 and 106 touch each other. Subsequently, the PMCCPU 12 reads the error value in the error register 31 (Step S8), while the NCCPU 11 subtracts the read error value from the amount of pulse distribution to the servomotor 103, thereby obtaining the present value of the position of the movable platen (Step S9). Then, the obtained present value is stored as the die-touch position in a die-touch position storage register TCHR (Step S10), the flag F1 for the execution of the die-touch position detecting operation is turned off, and the indication for the execution of the die-touch position detecting operation, on the CRT screen, is turned off (Step S11). Thus, the die-touch position detecting operation is finished.

If the set value used in Step S5 is made equal to a feed stop value of the CNC 10, the NCCPU 11 automatically stops the pulse distribution when the error value attains the feed stop value. Thus, the set value may be adjusted to the feed stop value.

If the output torque of the servomotor can be made very small by the torque limit operation, the operation of Step S7 to de-energize the servomotor 103 need not be performed. More specifically, the dies 105 and 106, in such a case, are pressed against each other with a very small force, so that there will not be any substantial difference if the die-touch position is obtained by subtracting the error value from the amount of pulse distribution immediately when the error value exceeds the set value.

I claim:

1. A die-touch position detecting apparatus for a motor-operated direct mold clamping mechanism, said mechanism having a movable platen movable relatively to a stationary platen, and a servomotor operatively coupled to said movable platen through a transmission mechanism and adapted to be driven by a servo-circuit, said apparatus comprising:

drive control means for outputting a first pulse distribution corresponding to a predetermined feed speed of the servomotor to said servo-circuit, thereby moving said movable platen toward said stationary platen;

a pulse encoder coupled to the servomotor for outputting a second pulse distribution corresponding to actual speed of the servomotor;

an error register coupled to the servo-circuit for receiving the first and second pulse distribution and determining an error value corresponding to a difference between the first and second pulse distributions;

stop means for causing said drive control means to stop the first pulse distribution to said servo-circuit when the error value in the error register of said servo-circuit exceeds a predetermined value; and calculating means for calculating a die-touch position in accordance with an amount of the first pulse distribution to said servo-circuit and said amount of error value when the first pulse distribution is stopped.

2. A die-touch position detecting apparatus of a motor-operated direct mold clamping mechanism according to claim 1, further comprising torque limiting means for limiting an output torque of said servomotor, whereby said drive control means drives said movable platen with a relatively low torque.

3. A die-touch position detecting apparatus of a motor-operated direct mold clamping mechanism according to claim 1, further comprising manually operable command means for delivering a die-touch position detecting operation command to the drive control means.

4. A die-touch position detecting apparatus of a motor-operated direct mold clamping mechanism according to claim 1, wherein said stop means delivers a control output when said amount of error value exceeds said predetermined value, said drive control means including means for deenergizing said servomotor in response to said control output, and said calculating means calculates the die-touch position in response to said amount of said first pulse distribution and the amount of said error value obtained after the deenergization of said servomotor.

5. A die-touch position detecting apparatus of a motor-operated direct mold clamping mechanism according to claim 2, further comprising manually operable command means for delivering a die-touch position detecting operation command to the drive control means.

6. A die-touch position detecting apparatus of a motor-operated direct mold clamping mechanism according to claim 2, wherein said stop means delivers a control output when said amount of error value exceeds said predetermined value, said drive control means including means for deenergizing said servomotor in response to said control output, and said calculating means calculates the die-touch position in response to said amount of said first pulse distribution and the amount of said error value obtained after the deenergization of said servomotor.

* * * * *